Aug. 8, 1939. C. JOHNSON 2,169,150
REGULATING APPARATUS
Filed June 1, 1936
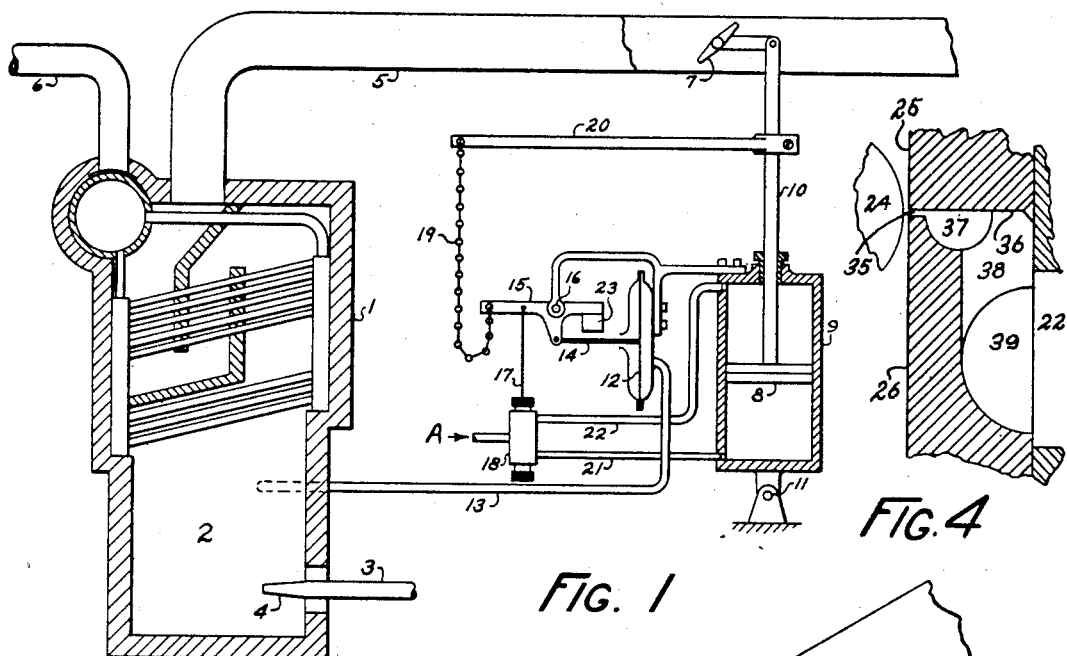
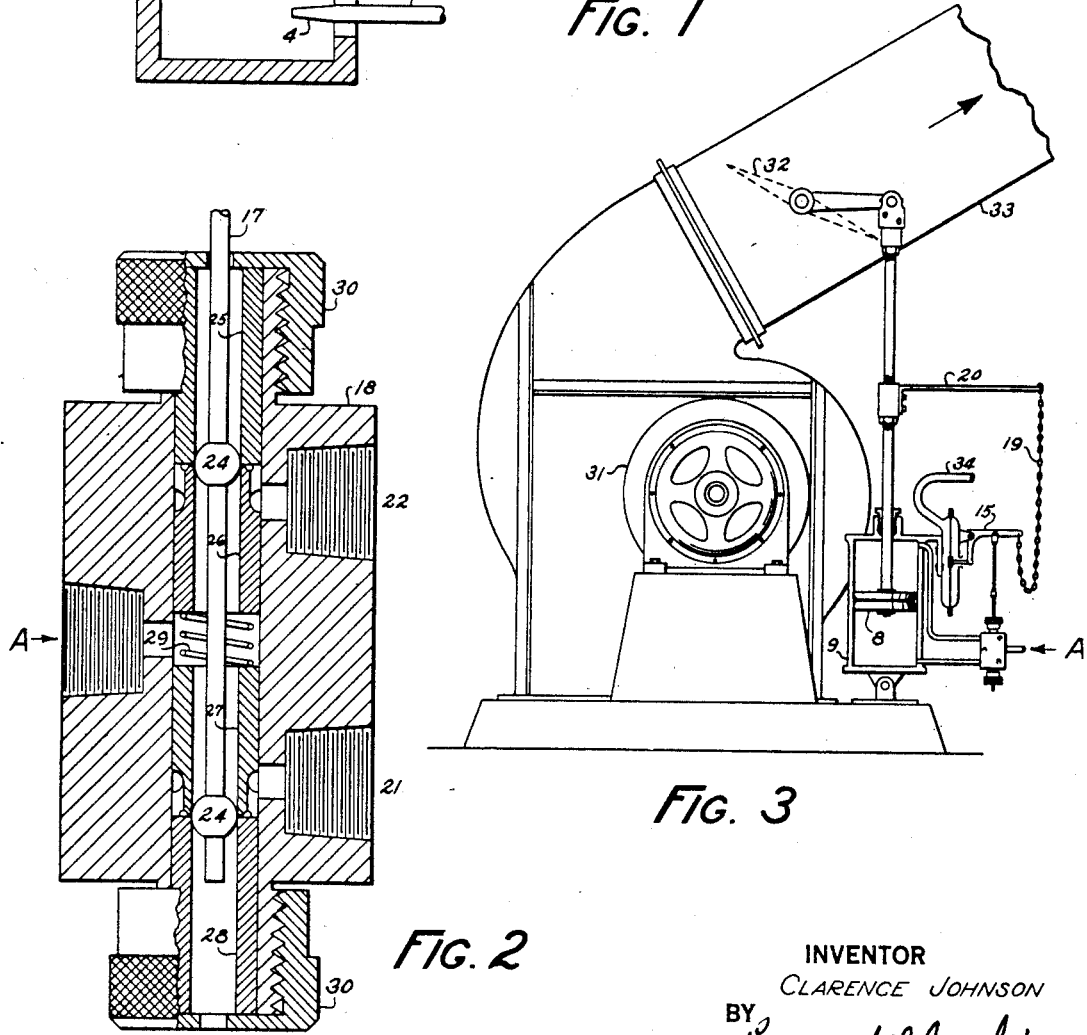
INVENTOR
CLARENCE JOHNSON
BY Raymond D. Junkins
ATTORNEY Patented Aug. 8, 1939

2,169,150

UNITED STATES PATENT OFFICE 2,169,150

REGULATING APPARATUS

Clarence Johnson, East Cleveland, Ohio

Application June 1, 1936, Serial No. 82,768

8 Claims. (Cl. 121—41)

This invention relates to the art of regulation and provides improvements in control or regulating systems and apparatus. It is primarily concerned with hydraulic, pneumatic or fluid pressure operated systems and of a type wherein a pilot valve positioned or moved by a relatively weak control force, in turn controls the application of fluid pressure for producing or controlling an amplified force whereby useful work is accomplished.

The relatively weak control force for positioning the pilot may be derived from any variable quantity, condition, relation, etc., such, for example, as pressure, temperature, flow or any physical chemical, thermal, electrical, hydraulic or other variable or relation of variables. It is not necessarily limited to positioning by such variables, but the pilot may be positioned by hand or in accordance with any movement to effect an amplified motion or positioning.

The present application is a continuation in part of my copending application, Serial No. 673,212, filed May 27, 1933 in the United States Patent Office, now Patent No. 2,054,464. Said copending application claims specifically the pilot valve structure, while the present application is directed to the actuator or regulating mechanism, including such pilot valve in combination and disclosed at Fig. 1 of the copending application and at Fig. 1 of the present application in identical fashion.

According to my invention the deflections of a Bourdon tube, galvanometer, or other device sensitive to the instantaneous magnitude of a variable or to a relation, or to a position, may be utilized to control a fluid pressure system and by suitable fluid pressure actuated devices controlled by the pilot valve so positioned, may provide an amplified force for controlling the operation of dampers, valves, etc. to effect a positioning, or a control.

The positioning or control so effected of dampers, valves, or other apparatus, may react to effect the value of the variable which initiated the control, or may not as desired.

In the present embodiment, which I have illustrated and will describe, I show a combustion control system wherein the absolute pressure within a furnace is controlled through regulation of the draft therethrough from an indication of such absolute pressure. It will be understood that the regulating mechanism claimed herein may equally as well be sensitive to some other condition and for the control of some other variable than those specifically illustrated and described.

In carrying out my invention in preferred form I utilize air under pressure as a pressure fluid which is controlled by a pilot valve for positioning pistons or other apparatus. However, it is not necessary that air be used, as water, oil, or other pressure fluids may equally as well be used. I have chosen, however, as a preferred embodiment to illustrate and describe my invention in connection with the usage of air under pressure.

A primary object of the present invention is to provide an improved regulating mechanism responsive to a pilot valve which may be positioned in accordance with the value of a variable condition, and which regulating apparatus may be used to control the value of a variable.

Another object is to provide a stable, non-hunting, regulating mechanism of improved design.

A still further object is to provide an improved torque amplifier whereby a relatively weak control force may be amplified in any desired degree to perform useful work.

Further features of my invention will become apparent from the following description and from the drawing in which:

Fig. 1 is a somewhat diagrammatic representation of a vapor generator and a furnace draft control therefor, to which the invention has been applied.

Fig. 2 is a sectional elevation to enlarged scale of the pilot valve of Fig. 1.

Fig. 3 is a further embodiment of my invention.

Fig. 4 is an enlarged detail of a part of Fig. 2.

Referring first to Fig. 1, I show therein a steam generating boiler 1 having a furnace 2 to which fuel, such as oil, is fed through a pipe 3, and air to support combustion is drawn in around a burner 4. The gaseous products of combustion pass from the boiler through an uptake or duct 5. Steam generated in the boiler passes therefrom through a conduit 6 to any point of usage (not shown).

I desirably control the positioning in the duct 5 of a damper 7 to vary the suction upon the combustion chamber 2 and thereby control the absolute pressure within the furnace or combustion chamber.

For positioning the damper 7 I provide a piston 8 cooperating in a cylinder 9 and having a piston rod 10 connected for movement of the damper. The cylinder 9 and related parts are pivotally supported at 11 as is clearly illustrated in the drawing.

For a motive fluid utilized in positioning the piston 8 I use compressed air, although such pressure fluid might readily as well be water, oil, or any desirable and well known type of fluid. At the various points throughout the drawing where air under pressure is available I indicate the broken ends of said supply pipes by the designation A. I do not feel that it is necessary to show that these various supply points A lead to a compressor or storage tank, or other source of supply, for such is a well known expedient.

I illustrate diagrammatically at 12 a diaphragm properly supported and encased in a manner that (in the drawing) the left-hand side of the diaphragm 12 is subjected to atmospheric pressure, while the right-hand side of the diaphragm is subjected to an absolute pressure effective through a pipe 13 from a desirable location in the furnace 2. That is, I locate through the wall of the furnace 2 an end of the pipe 13 at any elevation or point in the furnace 2 whereat I desire to maintain a predetermined absolute pressure. This arrangement provides that a differential pressure will be effective upon the diaphragm 12 representative of the absolute pressure at a location within the furnace 2 relative to the pressure of the atmosphere.

Connected to the diaphragm 12 I show a link 14 passing through the diaphragm casing and pivotally joined to a bell crank 15 which is pivotally connected at its elbow on a pivot 16 to a portion of the diaphragm support. Variations in differential pressure effective upon the diaphragm 12 cause a horizontal positioning of the link 14 for angular movement of the bell crank 15.

Suspended from the horizontal arm of the bell crank 15 is a link or stem 17 carrying at its lower end a pilot relative to a pilot casing 18. The pilot assembly is illustrated in greater detail in Fig. 2 of the drawing and comprises a principal feature of my aforesaid Patent No. 2,054,464. Also carried by the horizontal portion of the bell crank 15 is one end of a chain 19, the other end of which is connected to an arm 20 of the piston rod 10.

I will now describe the functioning and advantages of the pilot of Fig. 1 which I have shown to greatly enlarged scale and in sectional detail at Fig. 2 and Fig. 4.

The pilot comprises a stem 17, having enlargements 24 known as lands, positioned axially in the pilot casing 18 relative to ports 35 for controlling the passage of a pressure fluid therethrough. Air under pressure is admitted to the interior of the pilot casing 18 from a point of supply A, and the positioning therein of the pilot stem 17 controls air pressure in the discharge pipes 21, 22. Within the casing 18 is a sleeve surrounding the pilot 17 comprising in the present embodiment four sleeve sections, 25, 26, 27, 28 of substantially the same exterior and interior dimensions placed end to end within a central bore of the casing 18. As illustrated clearly in Fig. 2 the sleeve sections 25, 28 are similar and the sleeve sections 26, 27 are similar. Sections 25, 26 form a pair, as do sections 27, 28, and the two pair of mating sections are urged apart by the coil spring 29. Over the end of the sections 25, 28 most remote from the center of the casing are screw threaded the caps 30 which tend when screwed into place to urge the sections 25, 26 toward the sections 27, 28 against the action of the spring 29. The arrangement allows accurate machining of the sleeves 25, 26, 27, 28 before they are placed within the casing 18, and accurate location of the sleeves within the casing 18 through the arrangement of caps and the compression spring.

The land 24 is shown as spherical, although it may be formed of any desired contour. The present pilot is in the nature of a positioning device, giving a definite loading pressure at the ports for each positioning of the pilot stem away from a predetermined neutral position; rather than a quantity control of flow through the ports.

Due to the slight amount of clearance between the greatest diameter of the land 24 and the interior of the sleeve portion there will be a constant leakage or bleed of air from the supply A around the land and to the atmosphere through the caps 30. With the supply of air admitted between the two lands 24 there will be a constant bleed or leakage past each land, and thus an entirely balanced condition of pressure relative to the pilot stem 17 wherein no end thrust is produced in either direction. Furthermore, it is a well known principle that a spherical, cylindrical, conical, or similar shape of object, pivoted or held for free movement in a column of flowing fluid will tend to center itself in the column. Thus the lands 24 tend to center themselves within the interior of the sleeve portion allowing substantially uniform leakage at all points of the periphery of the lands and providing against possible friction in axial movement of the stem 17, for the fluid bled past the lands serves in the nature of lubrication thereof, which in addition to the fact that the lands are substantially centered and not touching the walls of the sleeves prevents friction during axial movement. In reality the valve member 17 does not touch the sleeves at any point, and therefore is practically frictionless as well as being to a certain extent lubricated by the air bleeding past it at all points of the periphery. Moreover, even though the member should not be properly aligned with respect to the sleeves and was not substantially centered in the column of bleed air, there would actually be nothing but a line contact at the greatest diameter of the lands so that the friction would be extremely slight.

With a constant bleed of air past the lands 24 to the atmosphere and full supply pressure at the interior of the sleeve between the lands there will be a definite gradation of pressure from the space interior of the sleeve and surrounding the stem 17 to the point of least clearance between the lands 24 in the sleeve, namely the point of greatest diameter of the lands 24.

The control of pressure fluid by the pilot is in the nature of supplying to each port 35 and to the regulating mechanism controlled thereby a pressure accurately depending upon the axial positioning of the pilot within its casing. By providing a constant bleed or leakage past the lands 24 to either end of the casing there is always a pressure gradient along the surface of the lands from its maximum to its minimum diameter. Such gradation will be from that of the supply pressure between the lands to that of substantially atmospheric pressure at the outlet side of the lands. If then the pilot stem 17 is moved axially relative to the ports, then the ports, each of very thin annular dimension, will be opposite some point of the pressure gradient dependent upon the amount of axial movement of the pilot stem. The lands 24 are so spaced along the stem 17 relative to the spacing of the ports that when the pilot stem 17 is in a predetermined neutral position equal pressures of some value greater than atmospheric, but less than the value of the supply A, will exist in the outlet pipes 21, 22. As the pilot stem 17 is moved axially upward (in the drawing) the pressure at the outlet 22 will increase while that at the outlet 21 will decrease.

In Fig. 4 I show in enlarged detail a portion of the assembly of Fig. 2 adjacent the uppermost land 24 and for the primary purpose of more clearly illustrating the port and passageway for the air pressure from the source A to the outlet 22. The clearance between the land 24 and the sleeves 25, 26 has been exaggerated. The land 24 is shown with its greatest diameter adjacent the thin annular port 35. The sleeves 25, 26 abut as at 36, permitting a thin annular clearance 35 surrounding the land 24. The annular port 35 communicates with an annular recess 37 in the end of sleeve 26 and the recess 37 in turn communicates by a plurality of axially arranged passages 38 with a larger annular passage 39 at the exterior of the sleeve section 26. The passage 39 in turn communicates with an outlet pipe 22. It will be appreciated that the clearance, in an axial direction, between the innermost edges of the sections 25, 26 forming the port 35 is in the nature of only a few thousandths of an inch.

The operation of the entire system (Fig. 1) is as follows:

Assuming a condition of equilibrium wherein the pressure within the furnace 2 is as desired and the parts substantially as shown in the drawing. Now assume that for some reason the suction within the furnace 2 has increased, thereby lowering the absolute pressure. The result is a movement of the diaphragm 12 toward the right carrying with it the link 14 and positioning the bell crank 15 in a counterclockwise direction around its pivot 16. The pilot stem 17 is lowered in the casing 18. Air from the source A is admitted through the pipe 21 to the cylinder 9 below the piston 8, while air from above the piston 8 is bled through a pipe 22 to the atmosphere. The result is an upward positioning of the piston 8 carrying with it the piston rod 10, the arm 20, and positioning the damper 7 in a closing direction, whereby the effect of the stack upon the uptake 5 is decreased and the suction upon the furnace 2 is decreased.

Simultaneously, the end of the chain 19 fastened to the arm 20 is raised, thus decreasing the weight effective upon the horizontal arm of the bell crank 15. The weight of the chain 19 which is effective upon the bell crank 15, plus the force of the diaphragm upon the bell crank, are opposed by a counterweight 23 of fixed or adjustable value. Thus a decrease in the amount of effective chain 19 through an upward movement of the arm 20 causes the counterweight 23 to be effective in positioning the bell crank 15 in a clockwise direction, whereby the pilot is positioned back to its original position and upward travel of the piston 8 is stopped due to the fact that pressures below and above the piston 8 are equalized and locked by the return of the pilot 17 to its predetermined neutral position.

For every pressure within the furnace 2 there is a definite position of the piston 8 and damper 7, but the adjustment is such that the range of pressure is extremely small for full travel of the piston and damper and a substantially constant pressure is thus maintained. The system comes to a condition of equilibrium for every furnace pressure wherein the amount of weight of the chain 19 effective upon the bell crank 15, plus the differential pressure effective upon the diaphragm 12, is just counterbalanced by the counterweight 23 with the pilot in neutral position. If such a balance of forces does not exist then the pilot will not be in its neutral position and the piston 8 will move in one direction or the other with a resultant change in weight of the chain 19 effective upon the bell crank 15 until such condition of equilibrium does obtain.

At any instant when equilibrium obtains and the pilot is in its neutral position there is a substantially locked condition of the piston 8 with equal pressures on opposite sides of the piston. When the pilot moves in one direction or the other from its neutral position then air at a pressure depending upon the amount of movement of the pilot from neutral is effective upon one side of the piston 8 while air from the other side of the piston is bled to the atmosphere.

In Fig. 3 I illustrate a further embodiment somewhat similar to that of Fig. 1, except herein the control is of a blower or fan discharge. For example, the fan motor 31 may drive the fan at a constant speed and the discharge or supply of air therefrom to be controlled by the positioning of a damper 32 in the discharge duct 33.

The pipe 34 may be connected to the duct 33 or to any pressure chamber wherein the pressure is affected by variations in the pressure or flow of air in the duct 33.

In this embodiment the bell crank 15, while similar to that of Fig. 1 does not show a counterweight 23 as such weighting may be inherently designed into the bell crank and other parts of the mechanism.

In general I show a regulating or control mechanism comprising a unitary construction which may be located adjacent the damper, valve, or other regulable apparatus and remote from the pressure chamber to which the diaphragm 12 is sensitive. The apparatus comprises essentially a torque amplifier wherein a power cylinder of substantially any desired size or power is under the control of a pilot valve, which in turn is positioned by the relatively weak force of a diaphragm or similar mechanism under the control of the variable condition, such as absolute pressure within the furnace 2. Movement of the power piston causes a variable loading of the mechanism positioning the pilot valve through the variable application thereto of a loading chain providing a substantially infinite number of loading values between maximum and minimum.

While I have illustrated and described the present invention in preferred form and utilized in a single arrangement for control it is to be understood that the apparatus may assume other forms, shapes, or arrangements, than those which I have illustrated. For example, the sensitive member need not be a diaphragm but might be an expansible metallic bellows, a Bourdon tube, or in fact any mechanism sensitive to and positioned in accordance with the instantaneous value of a variable to be utilized as a control function or force and whose relatively weak force is desirably to be amplified or magnified to perform useful work. Furthermore while I have described the present invention as utilizing air under pressure as a pressure fluid, it may equally as well be considered in connection with the use of oil, water, or any similar fluid which is controlled to procide an amplified power means in novel arrangement. In any event it is to be understood that the showing is illustrative and that I am to be limited only by the claims in view of prior art.

What I claim as new, and desire to secure by Letters Patent of the United States, is:

1. In combination, a pressure fluid controlling pilot valve having a source of supply and two outlet ports, a power cylinder having therein a piston, the said ports connected to the cylinder at opposite sides of said piston, said pilot valve adapted to provide a pressure gradient adjacent said ports upon axial movement of the pilot, and loading means comprising a chain one end of which is positioned with said piston and the other end with said pilot.

2. A regulator comprising in combination, a pressure fluid controlling pilot valve, means sensitive to the instantaneous value of a variable condition for positioning said pilot, a power piston under the control of said pilot, and a loading chain one end of which is positioned with said pilot and the other end with said power piston.

3. A regulator comprising in combination, power means including a cylinder and a piston therein, a pressure fluid controlling pilot valve adapted to cause a positioning of said piston in said cylinder when said pilot is moved in one direction or the other from a predetermined neutral position, means sensitive to the value of a variable condition for positioning said pilot, and a loading means for said last named means comprising a chain one end of which is carried thereby and the other end of which is carried by the piston.

4. Apparatus for controlling a variable condition, comprising in combination, power means including a movable member for actually changing the value of the variable condition, means sensitive to the value of the variable condition, and balancing means comprising a chain one end of which is positioned by and with said movable member and the other end of which is positioned by and with said sensitive means.

5. A regulator comprising in combination, pilot valve, means for positioning said pilot valve, a power device under the control of said pilot and an elongated flexible weight loading means one end of which is positioned with said pilot and the other end with said power device.

6. A regulator comprising in combination, pilot valve adapted to be positioned for controlling a pressure fluid, a fluid pressure responsive power device under the control of said pilot, and a flexible weight loading means one end of which is positioned with said pilot and the other end with said power device.

7. A regulator comprising in combination, a pressure fluid controlling pilot valve, means sensitive to the instantaneous value of a variable condition for positioning said pilot, a power means having a movable member under the control of said pilot, and a loading chain one end of which is positioned with pilot and the other end with the movable member of said power means.

8. A regulator comprising in combination, power means including a movable member, a pressure fluid controlling pilot valve adapted to cause a positioning of said movable member when said pilot is moved in one direction or the other from a predetermined neutral position, means sensitive to the value of a variable condition for positioning said pilot, and a loading means for said last named means comprising a chain one end of which is carried thereby and the other end of which is carried by the movable member of said power means.

CLARENCE JOHNSON.